Nov. 2, 1948.   B. CHODAK   2,452,994
SHOPPING BAG
Filed Jan. 21, 1947

Inventor
Bernard Chodak

By Clarence A. O'Brien
and Harvey B. Jacobson
Attorneys

Patented Nov. 2, 1948

2,452,994

UNITED STATES PATENT OFFICE 2,452,994

SHOPPING BAG

Bernard Chodak, Brooklyn, N. Y.

Application January 21, 1947, Serial No. 723,441

1 Claim. (Cl. 150—1.7)

This invention comprises novel and useful improvements in a shopping bag and more specifically pertains to a construction of receptacle providing auxiliary compartments for carrying articles as desired.

The principal objects of this invention are to provide a shopping bag which is provided with collapsible compartments attached thereto for increasing the carrying capacity of the bag; wherein the auxiliary compartments may be collapsed and retained in their collapsed position when not required for use; wherein auxiliary handle means are provided secured to the auxiliary compartments whereby the load of the bag may be more evenly supported; wherein a novel, convenient and readily telescoped handle may be attached to the auxiliary compartments of the bag and may be selectively extended for use or retracted therein into concealed position when not in use.

Further objects of the invention reside in providing a shopping bag which is readily collapsed or expanded to its maximum carrying capacity; is of an inexpensive and durable construction; and which is highly efficacious for the purposes intended.

These, together with various ancillary objects of the invention which will later become apparent as the following description proceeds, are realized by this invention, one embodiment of which has been illustrated, by way of example only, in the accompanying drawings, wherein.

Figure 2:
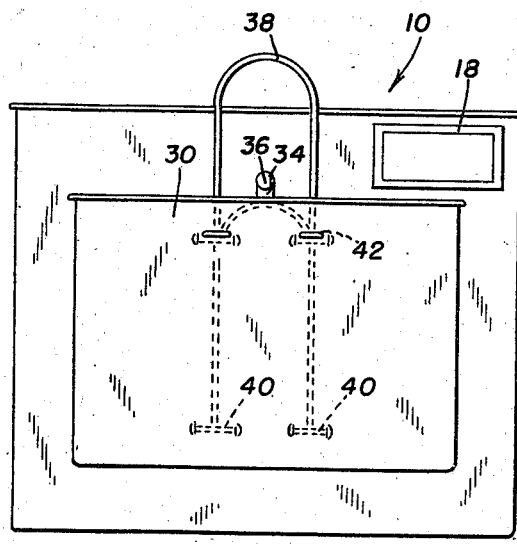
Figure 2 is a side elevational view of the bag.

Referring now more specifically to the accompanying drawings, wherein like numerals indicate similar parts throughout the various views, 10 designates generally the improved shoppers' bag which may be formed of any suitable material and construction but is preferably of a yieldable, pliable and foldable nature. The device comprises a main or central bag compartment 12 having an open top and closed bottom and provided with side walls 14 and end walls 16. As shown in Figure 2, a plate 18 may be attached to the upper portion of one of the side walls 14 in order to insert under a transparent cover, the name and address of the owner of the bag. It should be understood that this plate may be employed or omitted to suit the convenience of the manufacturer or vendor of this article.

A pair of loop handles 20 are attached to the upper portions of the side walls 14 of the main compartment 12, in any suitable manner and for their normal functions. Suitably positioned upon the outer surfaces of the side walls 14, are spherical protuberances 22 constituting part of a detachable fastening means to be later set forth.

Figure 3:
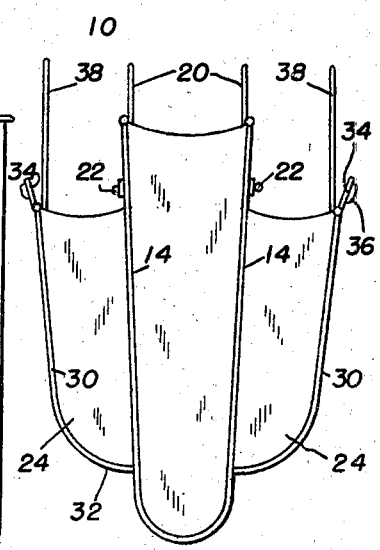
Figure 3 is an end view of the bag in its expanded position.

Attached to the side walls of the main bag compartment 12, are a pair of auxiliary compartments 24 or pockets, each principally consisting of a unitary piece of material having end walls 26 which are inturned as at 28 for attachment to the side walls 14, and an integral outer wall 30. As shown clearly in Figure 3, the unitary material forming the auxiliary compartments includes a bottom portion 32, whereby a pair of laterally extending open topped compartments are attached to the sides of the main shopping bag. Secured to the upper surfaces of the side walls 30 of the auxiliary compartments are tabs or straps 34 provided with a preferably metallic or plastic cup 36 constituting a fastening element which is complementary to the buttons 22 above mentioned. The end walls 26 of the auxiliary compartments are of a pleated or otherwise foldable nature, whereby the auxiliary pockets may be collapsed against the main bag section and retained in their collapsed position by engagement of the fastener members 36 and 22. In similar manner, the end walls 16 of the main bag compartment 12 may be collapsed whereby the entire article may be conveniently and compactly arranged for transportation or storage as indicated best in Figure 4.

In accordance with the dictates of this invention, each of the outer side walls 30 of the auxiliary compartments are provided with a pair of auxiliary handles 38 which may be selectively extended as shown in full lines in Figure 2, or retracted as shown in dotted lines therein into their concealed or stored position. Each of these handles 38 preferably comprises a single loop of material such as a cord or strap, whose legs at their lower ends terminate in transverse members 40 preferably of some rigid construction.

Figure 1:
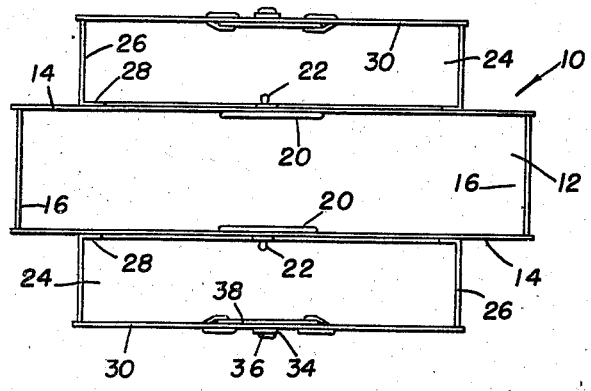
Figure 1 is a top plan view of the bag in its expanded position.
Figures 5, 6:
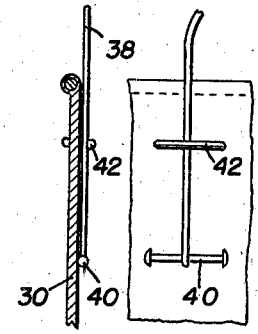
Figure 4:
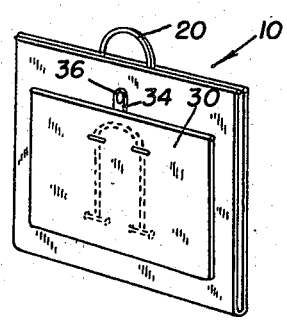
Figure 4 is a perspective view of the shopping bag in its fully collapsed position; and, Figures 5 and 6 are fragmentary detail views in section and elevation of the handle construction of the auxiliary compartments of the bag.

As indicated in Figures 2 and 4 and shown best in Figures 5 and 6, the depending legs of the handles 38 are slidably disposed through straps 42 secured upon the inner surface of the outer walls 30 of the auxiliary compartments adjacent their upper ends, for retaining the loops or handles 38 within the auxiliary compartments and providing an anchoring means for limiting the extension of these handles.

The above described construction has many practical advantages, and alternative modes of operation. For transporting the empty bag, the device will be collapsed into the position shown in Figure 4. For normal use, the auxiliary compartments will remain in their collapsed and retained position as shown in Figure 4, but the main compartment 12 will be opened and the device employed as any conventional shopping bag. When desired, either one or both of the auxiliary compartments 26 may be opened to increase the carrying capacity of the bag, and to segregate the contents thereof, as desired. The auxiliary handles 38 may be extended to provide alternative or assisting handles for supporting the load of the bag, and it will be noted that these handles may be employed even though the auxiliary compartments are not used but remain in their closed position.

Since various embodiments will readily occur to those skilled in the art, after consideration of the foregoing specification and the annexed drawings, it is not desired to limit the invention to the exact construction shown and described, but all suitable modifications and equivalents may be resorted to falling within the scope of the appended claim.

What I claim is:

A shoppers' bag including a main compartment of flexible sheet material having side walls and handles thereon, a pair of auxiliary compartments each consisting of a unitary piece of flexible sheet material secured at its side edges and bottom to the outer surface of a side wall to form an open pocket, auxiliary handles secured to the interior surface of the outer wall of each of said auxiliary compartments, means for selectively collapsing and retaining said auxiliary compartments in folded position upon said side walls, said last mentioned means including snap fastener elements secured to the outer surface of said side walls and to the inner surface of the outer walls of said auxiliary compartments, said auxiliary handles being slidably connected to the inner surface of the outer walls of said auxiliary compartments and being selectively extended from and retracted into said auxiliary compartments.

BERNARD CHODAK.

REFERENCES CITED

The following references are of record in the file of this patent:

UNITED STATES PATENTS

| Number | Name | Date |
|---|---|---|
| 1,666,704 | Hunter | Apr. 17, 1928 |
| 1,979,263 | Halpin | Nov. 6, 1934 |
| 2,096,895 | Halpin | Oct. 26, 1937 |
| 2,181,208 | Satz | Nov. 28, 1939 |

FOREIGN PATENTS

| Number | Country | Date |
|---|---|---|
| 306,267 | Great Britain | Feb. 21, 1929 |
| 547,391 | Great Britain | Aug. 25, 1942 |